United States Patent [19]

Kuntz et al.

[11] Patent Number: 5,309,092

[45] Date of Patent: May 3, 1994

[54] TOKEN RING TEST SIMULATION METHOD AND DEVICE

[75] Inventors: David Kuntz; Bharat Singh, both of Roseville; Kittur Nagesh, Sacramento; Ronald McBride, Auburn, all of Calif.

[73] Assignee: Hewlett-Packard Company, Palo Alto, Calif.

[21] Appl. No.: 9,523

[22] Filed: Jan. 27, 1993

[51] Int. Cl.⁵ .............................................. G01R 31/02
[52] U.S. Cl. ............................. 324/158 R; 324/158 F
[58] Field of Search .............. 324/158 R, 158 F, 73.1; 370/85.4, 85.5; 340/825.05

[56] References Cited

U.S. PATENT DOCUMENTS 4,042,830  8/1977  Kellenbenz et al. ............. 324/158 R
4,357,574 11/1982  Takamisawa et al. ............. 324/73.1

OTHER PUBLICATIONS

"802.5 Token Ring Interface-Some Notes on Testing," K. Nagesh, presented to IEEE 802.5 Committee, Jul, 1991, pp. 1-8.

Primary Examiner—Ernest F. Karlsen

[57] ABSTRACT

A loopback connector system for testing token ring components such as routers or interface assemblies with requiring that the component to be tested be connected into the local area network (LAN). The connector permits the component to be tested to be isolated from the LAN, permitting the integrity of the component to be tested without regard to the integrity of lobe cables or other devices on the ring, and without degrading network performance. The connector system includes two different multi-pin connector types, a DB9 and an RJ45 connector, used to connect into the network, separated by a short two-pair cable. Resistors used to simulate the network loading on the component are connected between appropriate pins, with the resistors being shared between the two types of connectors.

11 Claims, 2 Drawing Sheets

TOKEN RING TEST SIMULATION METHOD AND DEVICE

BACKGROUND OF THE INVENTION

This invention relates to token ring local area networks, and more particularly to a means for diagnosing the integrity of a particular hardware component without connecting the component into the network.

One local area network ("LAN") architecture is the Token Ring topology local area network at 4- and 16-Mbit/second. IEEE 802.5 is an IEEE local area network standard that closely follows the token ring standard, and currently supports 4-Mbit/second token ring networks. IEEE 802.5 is described in "Token Ring Access Method and Physical Layer Specifications," ISBN 1-55937-012-2, IEEE Std. 802.5-1989 (ANSI), IEEE, 345 E. 47th Street, New York, N.Y. 11017. Token ring and IEEE 802.5 topologies connect computer systems in a local environment.

In order to test hardware components connected into a token ring or IEEE 802.5 LAN, one must also consider lobe cables connecting the components, other devices on the ring, and the risk of degrading the network performance while performing the testing. It has been necessary in the past to supply a "known good" lobe cable and a "known good"0 Token Ring Multi-Station Access Unit (MsAU) with no other nodes attached to achieve adequate troubleshooting capability. The MsAu is a passive device which includes a relay set, and receives power to operate the relays from node devices inserted into the ring.

It would therefore represent an advance in the art to provide a means for diagnosing the integrity of a particular hardware component for a token ring LAN without connecting the component into the network.

SUMMARY OF THE INVENTION

A test connector system is described for permitting a Token Ring local area network (LAN) component to be tested without hooking the component into the network, wherein the component includes a multi-pin electrical connector for connecting the component into the network. In a general sense, the test connector includes a compatible connector means for connecting to the component connector. The connector means includes a pin pattern for mating with the component connector, and load simulating means connected to selected ones of the pins of the test connector means for simulating the nominal electrical load presented to the network component when connected into the Token Ring network. The load simulating means includes first and second resistors connected across first and second pairs of the connector means pins.

Preferably, the connector means of the system includes first and second connectors of different types, e.g., DB9 and a RJ45 connectors connected by a short two-wire pair cable. The two connector types share common load simulating means. Preferably the load simulating means are two resistors molded into the housing of one of the two connectors. In this manner, the test connector system is multipurpose, having the capability of connecting to two different connector types.

In accordance with the invention, a method for testing a Token Ring LAN component using the test connector is described, wherein the component to-be-tested is not connected into the LAN. The compatible connector means is connected to the connector of the component to-be-tested, instead of to a LAN as in the conventional testing sequence, and functional electrical tests are performed on the LAN component to determine its functionality in the LAN.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
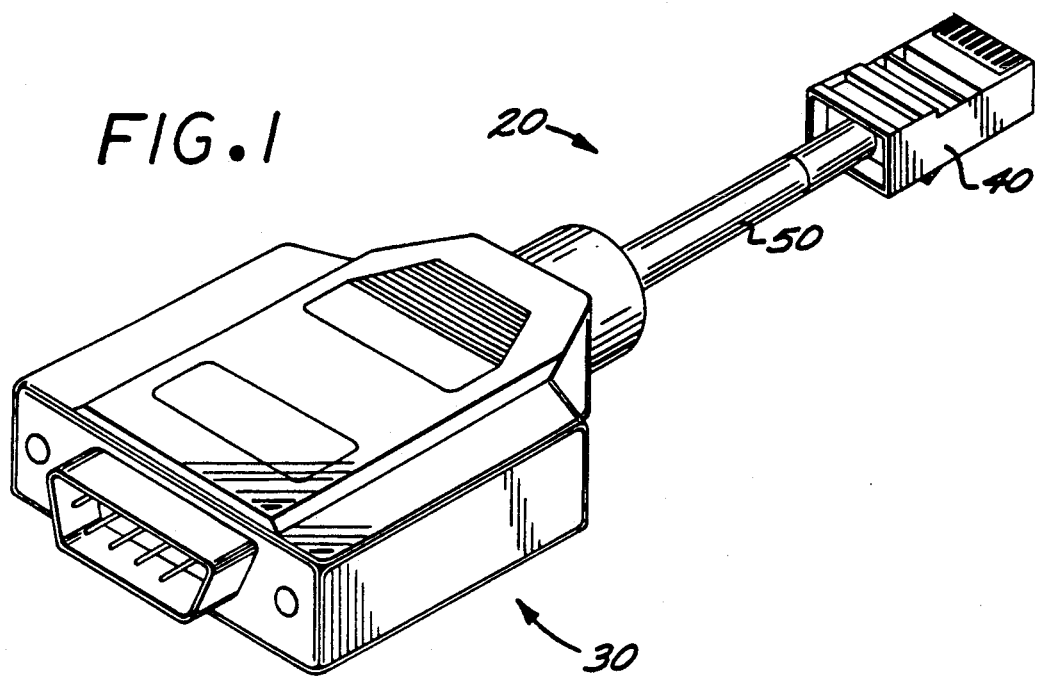
FIG. 1 is an isometric view of a token ring loopback connector in accordance with the invention.

A Token Ring loopback connector system 20 in accordance with this invention is illustrated in FIG. 1. The connector system 20 includes two connectors 30 and 40 separated by a short cable 50. Connector 30 in this embodiment is a nine pin DB9 connector. Connector 40 is an eight pin RJ45 connector. The cable 50 is required to include only two wire pairs, and has a typical length in this embodiment of 90 mm.

Figure 2:
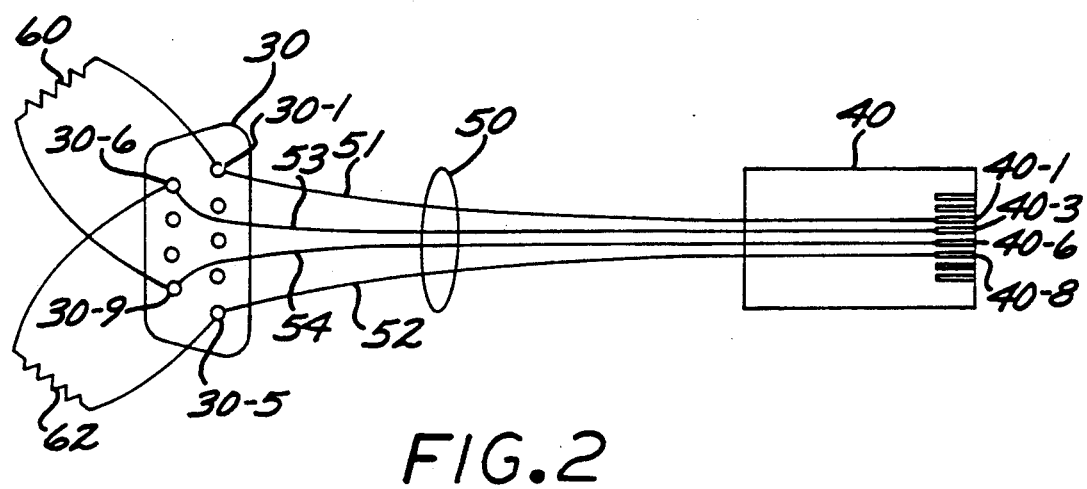
FIG. 2 is a schematic representation of the connector of FIG. 1.

FIG. 2 shows the connector system 20 in further detail. The connector 30 includes nine pins 30-1 . . . 30-9. The connector 40 includes eight pins 40-1 . . . 40-8.

The first wire pair comprising the cable 50 is made up of wires 51 and 52. Wire 51 is connected between pin 40-3 of connector 40 and pin 30-1 of connector 30. Wire 52 is connected between pins 40-6 and 30-5.

The second wire pair comprising the cable 50 is made up of wires 53 and 54. Wire 53 is connected between pin 40-4 and pin 30-6. Wire 54 is connected between pin 40-5 and pin 30-9.

The connector system 20 further includes a first resistor 60 shunting the wire 51 of the first cable pair and the wire 54 of the second wire pair. A second resistor 62 shunts the wire 53 of the second wire pair and the wire 52 of the first wire pair. Each resistor 60 and 62 has a resistor value of 3.16 Kohm in this embodiment, which is designed to provide the load expected by the Texas Instrument Token Ring chipset, including the controller chip TMS38053 and the ring interface chip TMS38053. This chipset can be used in Token Ring components to provide the necessary protocol interface into the LAN.

Figure 3:
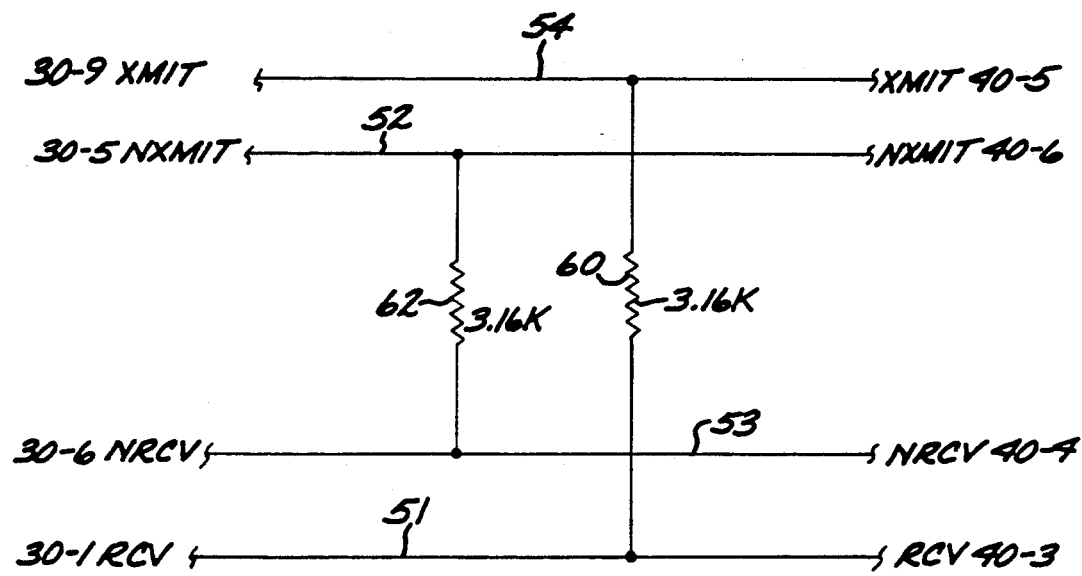
FIG. 3 is an electrical schematic diagram of the loopback connector of FIG. 1.

An electrical schematic of the system 20 is shown in FIG. 3. The resistors 60 and 62 are respectively connected between two transmit-receive pairs, to permit the unit under test to transmit signals from the unit transmitter which are "looped back" to the unit receiver via the resistor loads. The Token Ring interface employs a protocol using balanced drivers and differential receivers. The receivers determine the differential voltage appearing across two receiver terminals, in an arrangement which tends to cancel noise transmitted across the network. Thus, there are two transmit terminals, labeled here as XMIT and NXMIT, and two receive terminals RCV and NRCV. As shown in FIG. 3, the XMIT and NXMIT terminals correspond to pins 30-9 and 30-5, respectively, of the RJ45 Connector 30, and pins 4-5 and 40-6 of the DB9 connector 40. The RCV and NRCV terminals correspond to pins 30-1 and 30-6, respectively of the RJ45 connector 30, and to pins 40-3 and 40-4 of the DB9 connector 40.

To provide compatibility with the Token Ring protocol, the TI chipset referenced above provides the capability of sensing when it has been properly inserted into the ring, by sensing the MsAU load. The load the TI chipset expects to see is that provided by the 3.16 Kohm resistors 60 and 62. Only after proper insertion of the unit into the ring has been sensed will transmit operations by the unit be permitted, and the unit sends a signal to open a relay in the MsAU.

The loopback connector system 20 simulates the load that a Token Ring or IEEE 802.5 compatible interface expects when inserted into a ring. It also prevents a wire fault condition by simulating a ring insertion of the component under test.

The connector system 20 attaches directly to the Token Ring component being tested through either its DB9 or RJ45 connector. The Token Ring device being tested becomes the ring monitor in a single-node ring environment and simulates a short lobe cable. That is because there are no other node devices being simulated, and therefore, after the unit under test fails to receive a token from the simulated LAN, it will act to generate the token by default, under the Token Ring protocol.

For example, the test connector system 20 may be used to test LAN components such as routers or interface assemblies, without connection of the component to the network at large. As is well known, routers are types of interface equipment which adapt two dissimilar network protocols, e.g., Token Ring and Ethernet, to permit the interconnection of two different types of network. By way of example, the router equipment marketed by Hewlett-Packard Company, the assignee of this invention, includes a DB9 connector. The interface assemblies marketed by this company, which include plug-in board assemblies to permit a device such as a computer to be connected into a LAN, include both the DB9 and RJ45 connectors.

As presently written, the specification for the IEEE 802.5 network specifies only the DB9 connector, which is a shielded wire type of connector. However, RJ45 connectors, which are unshielded wire connectors, are also in common use in such networks.

The unit under test typically includes various self-testing capabilities. For example, units including the Texas Instrument chipset will include the self-diagnostic capabilities of that chipset. Thus, after connecting the connector system 20 to the unit-to-be-tested, the power to the unit can be turned on, which will initiate the self-diagnostics of the chipset comprising the unit. During the initial diagnostic routine, the chipset will determine whether it is properly connected into the Token Ring, by sensing the load of the MsAU. The connector system 20 simulates this load, and therefore the unit should if functional not only complete the self-diagnostic routines of the unit properly, but also permit additional testing. There are external test programs available today, which test the transmit and receive functions of the unit, by causing the unit to transmit known data over the LAN, and check to see whether the same data is properly received in the unit. While such programs are written for the case of a unit already connected into the LAN, they can also be used when the connector system 20 has instead been used. Data can be transmitted and received via the loopback connector arrangement, permitting the transmit and receive functionality of the unit to also be tested. Other functions can also be tested, since the connector system 20 simulates connection of the unit into the LAN.

Because the Token Ring topology has various connector interfaces, the system 20 combines both the DB9 connector and the RJ45 connector into a single component, making the system 20 a multi-purpose test device. This combination also permits each connector 30 and 40 to share the same load resistors. Moreover, the resistors can be protected in a common connector molding, typically the molding of the RJ45 connector housing.

Of course, it will be recognized that a loopback connector in accordance with this invention need not include both types of connectors, i.e., both the RJ45 and the DB9 connectors. For example, a test connector can be employed which includes only a DB9 connector, with the load resistors connected relative to the DB9 pins as shown in FIG. 3, or only an RJ45 connector with load resistors connected relative to the RJ45 pins as shown in FIG. 3.

Figure 4:
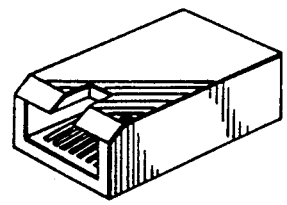
FIG. 4 is an isometric view of an RJ45—RJ45 adaptor which may be used with the loopback connector of FIG. 1.

With the addition of a female-female RJ45 receptacle, the connector system can be used to verify the integrity of an un-shielded twisted-pair lobe cable as well. FIG. 4 illustrates such an RJ45-RJ45 receptacle 70. A cable can be tested by use of the connector system 20 and a previously tested, known-to-be-good LAN node unit. This is done by hooking one end of the cable to the tested node unit, connecting the receptacle 70 to the other cable end, and connecting the connector system 20 to the other end of the receptacle. The unit can then be tested again, to determine if the cable is functional. Failure of the testing indicates failure of the cable, since the unit is known to be good. The same method can also be used to test a cable having six pin RJ-11 connectors, another type of unshielded wire connector. That is because the center four conductors/pins of the connectors map into the transmit/receive pairs used for connection to the RJ45 connectors.

The connector system can be used in a method to test Token Ring components, without connecting the component into the LAN. The method includes the following steps:

providing a test connector as described above including a compatible connector for connecting to the component connector, the compatible connector including a pin pattern for mating with the component connector, and load simulating means connected to selected ones of the pins of the test connector for simulating the nominal load presented to the LAN component when connected into the LAN;

connecting the compatible connector to the component connector, thereby simulating the connection of the component into the LAN; and performing test operations on the component to determine its functionality.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A multi-purpose Token Ring loopback connector system for permitting Token Ring local area network (LAN) components to be tested without connecting the component to-be-tested into said LAN, the components to-be-tested including either a first type of multi-pin electrical connector or a second type of multi-pin electrical connector for connecting said component into said LAN, wherein said system comprising:

first compatible connector means for connecting to said first type of electrical connector, said connector means including a pin pattern for mating with said first type of connector;

second compatible connector means for connecting to said second type of electrical connector, said connector means including a pin pattern for mating with said second type of connector;

means for electrically connecting corresponding first and second pin pairs of said first and second connector means; and load simulating means connected to said corresponding first and second pin pairs for simulating the nominal load presented to said network component to-be-tested when said component is connected into said Token Ring network, wherein said connector system may be used in the testing of a LAN component having either said first connector type or said second connector type.

2. The connector system of claim 1 further characterized in that said first compatible connector means comprises an RJ45 connector.

3. The connector system of claim 1, further characterized in that said second compatible connector means comprises a DB9 connector.

4. The connector system of claim 1 wherein said means for electrically connecting corresponding first and second pin pairs of said first and second connecting means comprises a dual wire pair cable, a first wire pair connecting between corresponding first and second pins of said first and second connector means, and a second wire pair connecting between corresponding third and fourth pins of said first and second connector means.

5. The connector system of claim 4 wherein said first and second pins are the XMIT and RCV pins, and said third and fourth pins are the NXMIT and NRCV pins of said first and second connector means.

6. The connector system of claim 5 wherein said load simulating means comprises a first resistor shunting said first wire pair, and a second resistor shunting said second wire pair.

7. The connector system of claim 6 wherein said first and second resistors have a resistance value of 3.16 Kohms.

8. The connector system of claim 6 wherein said first and second resistors are disposed within a housing for said first connector means.

9. The connector system of claim 1 wherein said load simulating means comprises means for simulating the load presented by a Token Ring multi-station access unit.

10. The connector system of claim 1 wherein said first connector means comprises an RJ45 connector, said second connector means comprises a DB9 connector, and said system further comprises a female-to-female RJ45—RJ45 adapter, wherein said system may be used to test a lobe cable for said Token Ring LAN.

11. The connector system of claim 1 wherein said load simulating means comprises a first resistor connected between a first transmit signal pin pair and a first receive pin pair, and a second resistor connected between a second transmit signal pair and a second receive signal pin pair.

* * * * *